(12) United States Patent
Barth et al.

(10) Patent No.: US 10,066,565 B2
(45) Date of Patent: Sep. 4, 2018

(54) METHOD FOR OPERATING AN INTERNAL COMBUSTION ENGINE

(71) Applicant: GE Jenbacher GmbH & Co OG, Jenbach (AT)

(72) Inventors: Christian Barth, Eicklingen (DE); Herbert Kopecek, Schwaz (AT); Nikolaus Spyra, Innsbruck (AT); Michael Waldhart, Telfs (AT)

(73) Assignee: GE JENBACHER GMBH & CO OG, Jenbach (AT)

( * ) Notice: Subject to any disclaimer, the term of this patent is extended or adjusted under 35 U.S.C. 154(b) by 106 days.

(21) Appl. No.: 13/966,625

(22) Filed: Aug. 14, 2013

(65) Prior Publication Data

US 2014/0052363 A1    Feb. 20, 2014

(30) Foreign Application Priority Data

Aug. 17, 2012 (AT) ..................... 895/2012

(51) Int. Cl.
*F02D 41/14* (2006.01)
*F02D 41/00* (2006.01)
(Continued)

(52) U.S. Cl.
CPC ....... *F02D 41/1486* (2013.01); *F02D 19/024* (2013.01); *F02D 29/06* (2013.01);
(Continued)

(58) Field of Classification Search
CPC ............. F02D 41/1486; F02D 41/0027; F02D 41/008; F02D 19/024; F02D 29/06;
(Continued)

(56) References Cited

U.S. PATENT DOCUMENTS 4,867,127 A    9/1989  Quirchmayr et al.
7,013,871 B2 *  3/2006  Zhu et al. ................ 123/406.21
(Continued)

FOREIGN PATENT DOCUMENTS

DE        199 55 252      6/2001
DE    10 2004 032 986      2/2006
(Continued)

OTHER PUBLICATIONS

Austrian Patent Office Search Report (ASR) dated Jul. 18, 2013 in Austrian Patent Application A 895/2012.
(Continued)

*Primary Examiner* — Joseph Dallo
(74) *Attorney, Agent, or Firm* — GE Global Patent Operations; Rita D. Vacca

(57) ABSTRACT

A method for operating an internal combustion engine, in particular a gas engine having at least two cylinders, includes acquiring a cylinder-specific first cylinder signal ($p_{max}$, E) from each cylinder. At least one combustion parameter (Q, Z) of the corresponding cylinder is controlled as a function of the first cylinder signal ($p_{max}$, E), and a cylinder-specific reference cylinder value ($p_{max}'$, E') is set for the first cylinder signal ($p_{max}$, E) for each cylinder. The at least one combustion parameter (Q, Z) of the cylinder is adjusted as a function of the deviation of the first cylinder signal ($p_{max}$, E) from the reference cylinder value ($p_{max}'$, E'), and the first cylinder signal ($p_{max}$, E) tracks the reference cylinder value ($p_{max}'$, E').

27 Claims, 7 Drawing Sheets

(51) Int. Cl.
  *F02D 19/02*     (2006.01)
  *F02D 29/06*     (2006.01)
  *F02D 35/02*     (2006.01)
  *F02D 41/40*     (2006.01)
  *F02D 37/02*     (2006.01)
  *F02M 21/02*     (2006.01)

(52) U.S. Cl.
  CPC ......... *F02D 35/023* (2013.01); *F02D 35/025* (2013.01); *F02D 41/008* (2013.01); *F02D 41/0027* (2013.01); *F02D 37/02* (2013.01); *F02D 41/0085* (2013.01); *F02D 41/401* (2013.01); *F02M 21/0278* (2013.01); *Y02T 10/32* (2013.01)

(58) Field of Classification Search
  CPC .... F02D 35/025; F02D 35/023; F02D 41/401; F02D 37/02; F02D 41/0085; Y02T 10/32; F02M 21/0278
  USPC ................. 123/435, 436, 673; 701/102–105, 701/111–115
  See application file for complete search history.

(56) References Cited

U.S. PATENT DOCUMENTS

| | | | |
|---|---|---|---|
| 7,021,287 B2* | 4/2006 | Zhu et al. | 123/435 |
| 7,051,516 B2* | 5/2006 | Pott | F01N 3/0842 123/481 |
| 7,086,382 B2* | 8/2006 | Daniels et al. | 123/406.23 |
| 7,104,043 B2* | 9/2006 | Zhu et al. | 60/284 |
| 7,134,423 B2* | 11/2006 | Zhu et al. | 123/406.14 |
| 7,137,382 B2* | 11/2006 | Zhu et al. | 123/435 |
| 7,213,573 B2* | 5/2007 | Daniels et al. | 123/406.28 |
| 7,322,341 B2* | 1/2008 | Yamaguchi | F02D 35/023 123/27 R |
| 7,472,687 B2* | 1/2009 | Zhu et al. | 123/406.34 |
| 7,690,352 B2* | 4/2010 | Zhu et al. | 123/406.14 |
| 7,726,276 B2* | 6/2010 | Aliakbarzadeh | F02D 41/0085 123/299 |
| 7,762,244 B2* | 7/2010 | Aliakbarzadeh | F02D 41/0085 123/568.11 |
| 7,894,972 B2* | 2/2011 | Aliakbarzadeh | F01N 11/007 123/434 |
| 7,957,889 B2* | 6/2011 | Portin | F02D 35/023 123/435 |
| 7,971,573 B2* | 7/2011 | Portin | F02D 35/023 123/299 |
| 8,032,294 B2* | 10/2011 | Loeffler | F02D 35/02 123/431 |
| 8,939,135 B2* | 1/2015 | Maruyama | 123/703 |
| 9,080,546 B2* | 7/2015 | Gottschalk | F02D 35/028 |
| 9,222,841 B2* | 12/2015 | Flik | F02D 35/023 |
| 9,316,169 B2 | 4/2016 | Barth et al. | |
| 2002/0088446 A1* | 7/2002 | Wachi | F02D 41/1474 123/673 |
| 2004/0003804 A1* | 1/2004 | Yasui | F02D 41/1458 123/673 |
| 2005/0071073 A1* | 3/2005 | Ueda | F02D 37/02 701/101 |
| 2005/0161033 A1* | 7/2005 | Okamoto | F02D 41/1439 123/673 |
| 2005/0211218 A1* | 9/2005 | Liu | F02B 1/14 123/299 |
| 2005/0235952 A1* | 10/2005 | Kuzuyama | F02D 13/0215 123/305 |
| 2006/0064226 A1* | 3/2006 | Damitz | F02D 35/02 701/103 |
| 2006/0086176 A1* | 4/2006 | Piewek | F02D 35/023 73/35.12 |
| 2006/0260592 A1* | 11/2006 | Rosel | F02D 41/008 123/673 |
| 2007/0021901 A1* | 1/2007 | Yamaguchi | F02D 35/023 701/105 |
| 2007/0119436 A1* | 5/2007 | Aliakbarzadeh | F02D 41/008 123/674 |
| 2007/0144481 A1 | 6/2007 | Ciecinski et al. | |
| 2007/0175446 A1* | 8/2007 | Ishizuka | F02D 35/023 123/435 |
| 2007/0186902 A1* | 8/2007 | Zhu et al. | 123/406.34 |
| 2007/0186903 A1* | 8/2007 | Zhu et al. | 123/406.37 |
| 2007/0265763 A1* | 11/2007 | Akazaki | F02D 41/1405 701/103 |
| 2007/0270983 A1* | 11/2007 | Yasui | F02D 35/023 700/31 |
| 2008/0009997 A1* | 1/2008 | Ketterer | F02D 41/0085 701/101 |
| 2008/0035125 A1* | 2/2008 | Jankovic | F02D 13/0234 123/556 |
| 2008/0066713 A1* | 3/2008 | Megli | F01L 9/04 123/295 |
| 2008/0264360 A1* | 10/2008 | Dagci | F02D 35/023 123/52.1 |
| 2008/0264382 A1* | 10/2008 | Kang | F02D 35/023 123/435 |
| 2008/0308067 A1* | 12/2008 | Schuckert | F02D 35/023 123/435 |
| 2009/0095250 A1* | 4/2009 | Kuzuyama | F02B 1/12 123/27 R |
| 2009/0101110 A1* | 4/2009 | Hathout | F02D 35/023 123/406.43 |
| 2009/0132145 A1* | 5/2009 | Angeby | F02D 35/02 701/102 |
| 2009/0182485 A1 | 7/2009 | Loeffler et al. | |
| 2009/0187325 A1* | 7/2009 | Loeffler | F02D 35/028 701/102 |
| 2009/0272367 A1* | 11/2009 | Aliakbarzadeh | F01N 11/007 123/673 |
| 2010/0077992 A1* | 4/2010 | Auclair | F02D 19/12 123/435 |
| 2010/0089364 A1* | 4/2010 | Flanagan | F02B 25/04 123/435 |
| 2010/0122688 A1 | 5/2010 | Sihler et al. | |
| 2010/0175462 A1* | 7/2010 | Doering | F01L 13/00 73/114.31 |
| 2011/0017173 A1* | 1/2011 | Portin | F02D 35/023 123/435 |
| 2011/0023826 A1* | 2/2011 | Portin | F02D 35/023 123/435 |
| 2011/0040477 A1* | 2/2011 | Eser | F02D 41/068 701/112 |
| 2011/0077840 A1* | 3/2011 | Nishigaki | F02D 41/1474 701/104 |
| 2011/0160982 A1* | 6/2011 | Kumar | F02D 41/0025 701/103 |
| 2011/0257921 A1* | 10/2011 | Monferrato | F02D 35/023 702/98 |
| 2011/0259298 A1* | 10/2011 | Imamura | F02B 19/108 123/436 |
| 2011/0315115 A1* | 12/2011 | Flik | F02D 35/023 123/435 |
| 2012/0006107 A1* | 1/2012 | Azadeh | F02D 41/008 73/114.31 |
| 2012/0022772 A1* | 1/2012 | Miyamoto | F02D 41/0037 701/104 |
| 2012/0191325 A1 | 7/2012 | Haskara et al. | |
| 2012/0204830 A1* | 8/2012 | Gottschalk | F02D 35/028 123/294 |
| 2012/0283936 A1* | 11/2012 | Hashemi | F02D 41/008 701/113 |
| 2013/0054117 A1* | 2/2013 | Loeffler | F02D 41/1401 701/104 |

FOREIGN PATENT DOCUMENTS

| | | |
|---|---|---|
| DE | 10 2010 045 689 | 4/2011 |
| DE | 10 2010 000 747 | 7/2011 |
| DE | 102010000747 A1 * | 7/2011 |

(56) References Cited

FOREIGN PATENT DOCUMENTS

| EP | 0 259 382 | 10/1989 |
|----|-----------|---------|
| EP | 2 136 058 | 12/2009 |
| JP | 4-101044 | 4/1992 |
| JP | 2000-18075 | 1/2000 |
| JP | 2001-329875 | 11/2001 |
| JP | 2002-61524 | 2/2002 |
| JP | 2005-240712 | 9/2005 |
| JP | 2007-231883 | 9/2007 |
| JP | 2009-74436 | 4/2009 |
| JP | 2009-168027 | 7/2009 |
| JP | 2010-1745 | 1/2010 |
| JP | 2010-84681 | 4/2010 |
| JP | 2010-112334 | 5/2010 |
| JP | 2014037835 A | 2/2014 |

OTHER PUBLICATIONS

European Search Report issued Nov. 29, 2013 in corresponding European Patent Application No. EP 13 00 3563.
Chinese Search Report dated Mar. 1, 2016 in corresponding Chinese Application No. 201310357391.8.
Unofficial English translation of Japanese search report issued in connection with corresponding JP Application No. 2013-168082 dated Dec. 25, 2015.

* cited by examiner

METHOD FOR OPERATING AN INTERNAL COMBUSTION ENGINE

BACKGROUND OF THE INVENTION

The invention relates to a method for operating an internal combustion engine, in particular a gas engine, having at least two cylinders. A cylinder-specific first cylinder signal is acquired from each cylinder, and at least one combustion parameter of the corresponding cylinder is controlled as a function of the first cylinder signal.

The cylinders of an internal combustion engine normally exhibit technical differences in combustion, i.e. when combustion parameters such as the quantity of fuel or the ignition point are controlled in an overall manner, the individual contributions by the cylinders to the total work carried out by the internal combustion engine are different. The term "overall control" or "overall engine control" of combustion parameters as used in the context of the invention means that all of the cylinders of an internal combustion engine are operated with the same values for the corresponding variables, i.e., for example, for overall control as regards fuel quantity, the same open period is applied to the gas injection valves for each cylinder, or for overall control as regards the ignition point, the ignition devices of the cylinders are each activated at the same piston position of the respective piston in the cylinder—normally expressed as the crank angle before TDC (top dead center of the piston in the cylinder).

The work of a cylinder in a reciprocating engine is transmitted via a crankshaft connected to a connecting rod of the cylinder to an output shaft of the internal combustion engine. Frequently, an electrical generator is connected to the output shaft in order to convert the mechanical energy of the output shaft into electrical energy. Of the various possibilities for cylinder balancing, focus is on balancing the peak pressures in the individual cylinders in order to obtain as even as possible a mechanical peak load on the components. Examples of major alternative balancing variations are optimizing the engine efficiency or minimizing pollutant emissions.

Having regard to cylinder balancing control, U.S. Pat. No. 7,957,889 B2 describes tailoring the introduction of fuel for each cylinder of an internal combustion engine such that the maximum internal cylinder pressure or peak cylinder pressure of each cylinder is set to a common target value with a tolerance band. The target value in that case is obtained from the arithmetic mean of all of the peak cylinder pressures.

The systems described until now use the arithmetic mean of cylinder-specific signals such as the peak cylinder pressure as the target variable for cylinder balance control. However, those systems do not take into account the cylinder-specific differences which arise, for example, from cylinder parameters such as air charge, deposits and wear, center of combustion, or mechanical tolerances. These, in particular, give rise to scatter in the emissions and combustion properties, which can lead to loss of efficiency. In this regard, cylinders with lower nitrogen oxide or NOx emissions can lose more efficiency than cylinders with higher NOx emissions can gain. Since overall—i.e. taken over the whole internal combustion engine—certain NOx limits often have to be complied with, such a spread in the NOx emissions from the individual cylinders often results in an overall loss of efficiency of the internal combustion engine due to the cylinder-specific differences in the cylinder parameters.

SUMMARY OF THE INVENTION

Thus, the aim of the invention is to avoid the disadvantages described above and to provide a method for operating an internal combustion engine which is improved compared with the prior art. In particular, cylinder-specific differences in cylinder parameters which can result in different emissions or efficiencies of the cylinders, should be taken into account.

Thus, according to the invention, a cylinder-specific reference cylinder value is set for the first cylinder signal for each cylinder. The at least one combustion parameter of the cylinder is adjusted as a function of the deviation of the first cylinder signal from the reference cylinder value, and the first cylinder signal tracks the reference cylinder value.

By the proposed method, cylinder-specific differences—for example in respect of the cylinder parameters air charge, deposits and wear, center of combustion or mechanical tolerances—are taken into consideration, by adjusting the combustion parameter of a cylinder in a cylinder-specific manner so that the cylinder-specific first cylinder signal tracks a respective cylinder-specific reference cylinder value. In this manner, the first cylinder signals of the cylinders expressly do not track a common reference value, but rather an appropriate reference cylinder value is set for each cylinder, by which the cylinder-specific differences of the cylinder parameters can be taken into consideration. In this manner it can, for example, be achieved that the cylinders of the internal combustion engine can exhibit similar emissions and/or similar efficiencies despite cylinder-specific differences in the cylinder parameters.

Preferably, at least one of the following cylinder-specific signals is acquired from each cylinder: internal cylinder pressure, cylinder exhaust temperature, nitrogen oxide emissions, combustion air ratio. In a particular variation, the cylinder-specific first cylinder signal which is acquired is a maximum internal cylinder pressure of a combustion cycle.

In order to obtain a better signal quality and thus a higher control performance, the cylinder-specific first cylinder signal of a cylinder is preferably the temporally filtered cylinder-specific first cylinder signal acquired over 10 to 1000 combustion cycles, preferably 40 to 100 combustion cycles.

In general, the combustion parameter of a cylinder may be adjusted if the deviation of the first cylinder signal from the reference cylinder value exceeds a specifiable tolerance value. In this manner, smoother control dynamics can be obtained.

Preferably, the cylinder-specific reference cylinder value comprises a statistical variable of the first cylinder signals of all cylinders, preferably the arithmetic mean, particular preferably the median, and comprises a cylinder-specific offset. The statistical variable can thus be the result of a statistical evaluation of the first cylinder signals from all cylinders. In a particularly preferred embodiment, the cylinder-specific reference cylinder value comprises the median of the first cylinder signals of all cylinders and a cylinder-specific offset.

Preferably, the cylinder-specific offset is determined by a difference value characteristic mapping. The difference value characteristic mapping takes into account a power equivalent of the output power of the internal combustion engine and/or charge air pressure of the internal combustion engine, preferably in addition charge air temperature and/or an engine speed of the internal combustion engine.

The difference value characteristic mapping for a desired optimization goal can be established on a test rig or by placing the internal combustion engine into operation.

Examples of optimization goals are as similar as possible NOx emissions for the cylinders or cylinder efficiencies which are maximized as far as possible taking the mechanical load limits or operating limits of the internal combustion engine or engine into account. Determination of the cylinder-specific offset can be carried out using appropriate computation methods, for example by establishing the characteristic mapping by computation in the form of polynomials or by interpolating between known values of duty points for the internal combustion engine.

In accordance with a particularly preferred embodiment, the cylinder-specific offset is determined as a function of at least one of the following cylinder-specific cylinder parameters: cylinder pressure during the compression phase before ignition, air mass equivalent, centre of combustion, compression ratio, ignition delay.

In general, the cylinder-specific offsets can be determined as a function of at least one cylinder-specific cylinder parameter and as a function of an optimization goal on a test rig and recorded in a characteristic mapping.

The determination of the mentioned cylinder parameters is known per se. Thus, the cylinder pressure during the compression phase before ignition, the air mass equivalent, and the center of combustion can, for example, be determined by a cylinder pressure sensor from the internal cylinder pressure profile over a combustion cycle for the corresponding cylinder. The compression ratio and the ignition delay can be determined under specific conditions from the cylinder pressure profile.

To determine an appropriate cylinder-specific offset, then, the respective deviation of at least one cylinder-specific cylinder parameter from the mean (for example arithmetic mean or median) of this cylinder parameter of all cylinders can be used.

In this manner, the cylinder-specific offset can be expressed as a sum of addends, wherein the addends correspond to the corresponding deviation of the cylinder-specific cylinder parameters—provided with positive or negative coefficients.

The deviation of the cylinder pressure of a cylinder during the compression phase before ignition can be expressed with respect to the arithmetic mean or median of the corresponding cylinder pressures of all of the cylinders, for example as a percentage. In this manner, an increased cylinder pressure with respect to the mean during the compression phase before ignition can result in a positive addend for the cylinder-specific offset.

The deviation of the air mass equivalent of a cylinder can be expressed with respect to the arithmetic mean or median of the air mass equivalents of all of the cylinders, for example as a percentage. In this manner, an increased air mass equivalent with respect to the mean can result in a positive addend for the cylinder-specific offset.

The deviation of the center of combustion of a cylinder can be expressed as a difference of the cylinder-specific center of combustion from the arithmetic mean or median of the centers of combustion of all of the cylinders, for example in degrees of crank angle. In this manner, a negative deviation of the center of combustion of a cylinder (i.e. an earlier center of combustion compared with the mean of the centers of combustion of all of the cylinders) can result in a positive addend for the cylinder-specific offset.

The deviation of the compression ratio of a cylinder can be expressed with respect to the arithmetic mean or median of the compression ratios of all of the cylinders, for example as a percentage. In this manner, an increased compression ratio with respect to the mean can result in a positive addend for the cylinder-specific offset.

The deviation of the ignition delay of a cylinder can be expressed as a difference of the cylinder-specific ignition delay from the arithmetic mean or median of the ignition delays of all of the cylinders, for example in degrees of crank angle. In this manner, a positive deviation of the ignition delay of a cylinder (i.e. a longer ignition delay compared with the mean of the ignition delays of all of the cylinders) can result in a negative addend for the cylinder-specific offset.

In other words, the cylinder-specific offset $\Delta m$ can be determined from the respective deviations of the cylinder parameters using the following formula:

$$\Delta m = a^* \Delta pverd + b^* \Delta air + c^* \Delta MFB + d^* \Delta \epsilon + e^* \Delta delay$$

wherein $\Delta pverd$ is the deviation of the cylinder pressure during the compression phase before ignition, $\Delta air$ is the deviation of the air mass equivalent, $\Delta MFB$ is the deviation in the center of combustion, $\Delta \epsilon$ is the deviation in the compression ratio (for example as a result of component tolerances), and $\Delta delay$ is the deviation in the ignition delay (for example resulting from wear of a spark plug and/or prechamber). Using the coefficients a, b, c, d, e associated with the deviations of the cylinder parameters, a weighting of the addends can be produced for the determination of the respective cylinder-specific offset $\Delta m$. By setting one or more of these coefficients to zero, the corresponding deviations for determining the cylinder-specific offset $\Delta m$ can be ignored. Moreover, selecting a positive or negative coefficient means that it is possible to determine whether a positive deviation results in a positive addend or in a negative addend for the cylinder-specific offset $\Delta m$.

Fine-tuning the coefficients a, b, c, d, e can, for example, be carried out on a test rig or when placing the internal combustion engine into operation. In this manner, the coefficients can each be set at a specific value. The coefficients can also be determined by analytical interventions, by simulations or based on measurements. It is also possible to acquire the cylinder parameters and the corresponding deviations online during operation of the internal combustion engine and also to change the coefficients as a function of the optimization goal during operation. In this manner, for example, abnormal combustion conditions can be reacted to, by making a cylinder get a higher offset $\Delta m$ if misfires occur or by making a cylinder get a lower offset $\Delta m$ if knocking and/or auto-ignition occur.

In a particularly preferred embodiment, the combustion parameter may be a quantity of fuel for the corresponding cylinder. In a prechamber ignition internal combustion engine, it may be the fuel quantity for the respective main combustion chamber of a cylinder. The fuel quantity for a cylinder can be increased if the cylinder-specific first cylinder signal is smaller than the cylinder-specific reference cylinder value, and the fuel quantity for a cylinder can be reduced if the cylinder-specific first cylinder signal is larger than the cylinder-specific reference cylinder value. Preferably, a fuel metering valve can be provided for each cylinder. In order to adjust the fuel quantity for a cylinder, the open period for the corresponding fuel metering valve is adjusted. Such a fuel metering valve is advantageously a port injection valve which is disposed in the inlet tract region of a cylinder. Port injection valves may also be used in this case which, for example, have only a completely open or a completely closed position. In this manner, the open period can be defined as the period of time in which the valve is in its completely open position. In general, however, stroke-controlled valves may be used in which, in order to adjust the fuel quantity for a cylinder, the open period and/or the opening stroke of a valve is adjusted.

Control of the fuel quantity combustion parameter so that the respective cylinder-specific first cylinder signal tracks the respective cylinder-specific reference cylinder value can—as a function of the cylinder-specific first cylinder signal used—be carried out in accordance with Table 1 below. Column 1 of Table 1 lists the respective cylinder-specific first cylinder signal and an appropriate scenario for acquiring the respective first cylinder signal. According to column 2 of Table 1, an increase in the fuel quantity for a cylinder occurs if the respective first cylinder signal is smaller than the corresponding cylinder-specific reference cylinder value. According to column 3 of Table 1, the fuel quantity for a cylinder is reduced if the respective first cylinder signal is larger than the corresponding cylinder-specific reference cylinder value. The fuel quantity can thus be increased for a cylinder by, for example, increasing the open period of a fuel metering valve associated with the cylinder. Correspondingly, the fuel quantity for a cylinder can be reduced by reducing the open period for the fuel metering valve associated with the cylinder.

TABLE 1

Control interventions regarding fuel quantity

| Cylinder-specific first cylinder signal | Increase fuel quantity for a cylinder in the event of | Reduce fuel quantity for a cylinder in the event of |
|---|---|---|
| Peak cylinder pressure, acquired by cylinder pressure sensor in combustion chamber | Lower peak cylinder pressure | Higher peak cylinder pressure |
| Cylinder exhaust temperature, acquired by thermocouple after outlet valve | Lower cylinder exhaust temperature | Higher cylinder exhaust temperature |
| Nitrogen oxide emissions, acquired by NOx probe | Lower nitrogen oxide emissions | Higher nitrogen oxide emissions |
| Reciprocal of combustion air ratio, acquired by broad band lambda probe or oxygen sensor | Lower reciprocal of combustion air ratio | Higher reciprocal of combustion air ratio |

In a further preferred embodiment, an ignition point for the corresponding cylinder may be set as the combustion parameter. Preferably, an ignition device is provided for each cylinder, wherein the ignition point for the ignition device is set in degrees of crank angle before TDC (top dead centre of piston in cylinder).

The ignition point is usually expressed in degrees of crank angle before TDC (top dead center of piston in cylinder) and indicates when an appropriate ignition device is fired in order to ignite a fuel or fuel-air mixture in the cylinder or combustion chamber. The ignition device in this case may be a spark plug (for example an electrode spark plug or laser spark plug) or a pilot injector in order to carry out pilot injection of diesel fuel, for example. The ignition device may also be a prechamber. Normally, the ignition point for each cylinder of an internal combustion engine is set with the same overall predetermined value (overall default value)—expressed as the crank angle before TDC. As an example, this value is 20 to 30 degrees of crank angle before TDC, wherein the value can be established from the speed of the internal combustion engine and/or as a function of the ignition device employed. This overall default value can be deduced from an ignition point characteristic mapping which sets out appropriate values for the ignition point as a function of power and/or charge air pressure and/or charge air temperature and/or engine speed of the internal combustion engine.

In a preferred embodiment of the invention, the ignition point for a cylinder can be set earlier (with respect to the overall default value) if the respective cylinder-specific first cylinder signal is smaller than the corresponding cylinder-specific reference cylinder value and the ignition point for a cylinder is set later (with respect to the overall default value) if the respective cylinder-specific first cylinder signal is larger than the corresponding cylinder-specific reference cylinder value.

Control in respect of the ignition point combustion parameter such that the respective cylinder-specific first cylinder signal tracks the respective cylinder-specific reference cylinder value can—as a function of the cylinder-specific first cylinder signal—be carried out in accordance with Table 2 below. In Table 2, column 1 lists the respective cylinder-specific first cylinder signal and an appropriate scenario for acquiring the respective first cylinder signal. Column 2 of Table 2 sets out an earlier ignition point for a cylinder if the respective first cylinder signal of the cylinder is smaller than the corresponding cylinder-specific reference cylinder value. Column 3 of Table 2 sets out a later ignition point if the respective first cylinder signal is larger than the corresponding cylinder-specific reference cylinder value.

TABLE 2

Control interventions regarding ignition point

| Cylinder-specific first cylinder signal | Set ignition point for a cylinder earlier in the event of | Set ignition point for a cylinder later in the event of |
|---|---|---|
| Peak cylinder pressure, acquired by cylinder pressure sensor in combustion chamber | Lower peak cylinder pressure | Higher peak cylinder pressure |
| Nitrogen oxide emissions, acquired using NOx probe | Lower nitrogen oxide emissions | Higher nitrogen oxide emissions |

According to a preferred embodiment, in order to set the at least one combustion parameter, a parameter is determined wherein preferably, the value of the parameter comprises a specifiable overall engine target value and a cylinder-specific difference value.

In the case of setting the ignition point combustion parameter, the cylinder-specific difference value may be in the range±4 degrees of crank angle before TDC, preferably in the range±2 degrees of crank angle before TDC.

The specifiable target value may be an overall value which is the same for all cylinders of the internal combustion engine.

In the case of setting the ignition point as the combustion parameter, the specifiable target value may be an overall default value for the ignition point in the cylinders of a stationary gas engine. In this respect, the specifiable target value may be deduced from an ignition point characteristic mapping. The ignition point characteristic mapping can set out appropriate values for the ignition point as a function of the power and/or the charge air pressure and/or the charge air temperature and/or the engine speed of the internal combustion engine. The values set out in the ignition point characteristic mapping may be determined on a test rig.

In the case of setting the fuel quantity as the combustion parameter, the specifiable target value may be an overall engine basic value for the open periods of fuel metering valves or gas injection valves for the cylinders of a stationary gas engine.

Basically, combustion processes in internal combustion engines can be categorized into air-led and fuel-led combustion processes. In an air-led combustion process, a fuel quantity to be metered is determined, for example, as a function of the duty point of the internal combustion engine and a specifiable target value for the fuel-air ratio, in order to obtain a specific emission level or a specific charge air pressure. The engine controls deployed thereby usually comprise an emission controller. In a fuel-led or gas-led combustion process, the fuel quantity to be metered is determined as a function of the duty point of the internal combustion engine and a specifiable target value for the power and/or the speed of the internal combustion engine. Fuel-led combustion processes are of particular application during variable speed operation of an internal combustion engine, in an internal combustion engine in isolated operation, during engine start-up, or when the internal combustion engine is idling. The engine controls deployed thereby usually comprise a power controller and/or a speed controller.

In the case of air-led combustion processes in which an emission controller is used, for example, then preferably, the specifiable target value is determined from a specifiable fuel-air ratio. Preferably, the specifiable fuel-air ratio is determined from a power equivalent for the output power of the internal combustion engine, preferably electrical power from a generator linked to the internal combustion engine, and/or from charge air pressure and/or from an engine speed of the internal combustion engine.

The term "power equivalent" as used in the context of this invention should be understood to mean the actual mechanical power of the internal combustion engine or a substitute variable corresponding to the mechanical power. An example of this may be electrical power from a generator linked to the internal combustion engine, which is measured from the power output of the generator. It may also be mechanical power computed for the internal combustion engine, which is calculated from the engine speed and torque or from the electrical power of the generator and the efficiency of the generator. It may also simply be the engine speed if the power uptake of the consumer is precisely known from the speed. Furthermore, the power equivalent may also be the indicated mean pressure which can be determined in known manner from the internal cylinder pressure profile, or it may be the effective mean pressure, which can be calculated from the output torque or from the electrical or mechanical power. In this regard, a power equivalent for the internal combustion engine can be determined from the known relationship between the effective mean pressure, the cylinder capacity and the work obtained from a power stroke.

The specifiable fuel-air ratio can be determined in known manner from the charge air pressure and the power of the internal combustion engine. In this manner, the specifiable fuel-air ratio for an internal combustion engine constructed as a gas engine may be determined, for example, in accordance with EP 0 259 382 B1.

The specifiable target value for the gas injection period can be determined from the flow behaviour of the gas injection valves and the boundary conditions prevailing in the gas injection valves (for example pressure and temperature of the combustion gas, intake manifold pressure or charge air pressure). The air mass equivalent (a value corresponding to the air mass) of the gas engine can be determined from the conditions in the intake manifold of the gas engine, in particular from the charge air pressure and the charge air temperature. Using the specifiable fuel-air ratio, the reference value for the mass of combustion gas can be determined. The required overall open period or gas injection period for the gas injection valves can be determined from the flow behaviour of the gas injection valves and the boundary conditions at the gas injection valves in order to introduce the previously determined mass of combustion gas into the gas engine. In this example, the overall gas injection period corresponds to the specifiable target value.

For gas-led combustion processes which, for example, employ a power controller and/or a speed controller, then preferably, the specifiable target value is determined as a function of the deviation of a power equivalent of the output power of the internal combustion engine from a specifiable target power equivalent and/or as a function of the deviation of an engine speed of the internal combustion engine from a specifiable target speed of the internal combustion engine.

In this manner, a power controller can be provided which, as a function of the deviation of an actual power equivalent of the output power (actual power) of the internal combustion engine (for example electrical power measured for a generator connected to the internal combustion engine) from the specifiable target power equivalent (reference power) of the internal combustion engine, can determine an overall engine default value for the fuel mass flow. Alternatively or in addition, a speed controller may be provided which determines an overall engine default value for the fuel mass flow as a function of the deviation of an actual engine speed (actual speed) of the internal combustion engine from the specifiable target speed (reference speed) of the internal combustion engine. From the determined target value for the fuel mass flow, the specifiable target value—for example for the overall engine open period of fuel metering valves or for the overall engine default value for the ignition point of ignition devices—can be determined.

In a particular variation, the cylinder-specific difference value contains a cylinder-specific pilot value. Preferably, the cylinder-specific pilot value is determined from a charge air pressure and preferably, in addition, from a charge air temperature of the internal combustion engine. In this manner, the cylinder-specific pilot values can be derived from measurements during placing the internal combustion engine into operation and, for example, can also be used as fall-back values in the event that a sensor for acquiring the cylinder-specific signal fails or is faulty.

The cylinder-specific pilot values may, for example, take into account the gas dynamics in the intake manifold and/or in the gas rail of a gas engine as well as appropriate component tolerances, wherein the gas dynamics may be determined from simulations or measurements. The gas dynamics and the impact of component tolerances are influenced, inter alia, by the charge air pressure, the engine speed and the charge air temperature. In this regard, it is advantageous to derive appropriate cylinder-specific pilot values from a characteristic mapping which contains corresponding values for different charge air pressures and charge air temperatures. In this manner, when placing the gas engine into operation, appropriate measured data may be acquired or appropriate characteristic mappings may be determined by tests or simulations. It is also possible to generate an adaptive characteristic mapping by online measurements during the operation of the gas engine.

Particularly advantageously, the cylinder-specific difference value is supplemented by an equalization value, wherein the equalization value corresponds to the arithmetic mean of the cylinder-specific difference values. This is particularly advantageous when installing or retro-fitting the proposed solution in internal combustion engines which until now have been operated without cylinder balancing or only with a general controller. By correcting the cylinder-specific difference values in this manner, in particular, an overall metered fuel quantity may not be influenced by the proposed solution and an overall emission control of the internal combustion engine does not have to be adjusted. Since the values for the respective ignition points can also be introduced into an overall engine control, correcting the cylinder-specific difference values also means that an unwanted impact on the overall engine control can be avoided in respect of setting the ignition point.

In a preferred embodiment of the invention, a combustion condition can be monitored for each cylinder and can be evaluated as being normal or abnormal with respect to a specifiable reference state. The combustion parameter of a cylinder is only adjusted if the combustion condition of the cylinder is judged to be normal. In this manner, knocking and/or no auto-ignition and/or combustion interruptions as the combustion condition can be monitored, and the combustion condition of a cylinder is judged to be normal if no knocking and/or no auto-ignition and/or no interruptions are discerned in the combustion. It is also possible in the case of cylinders which exhibit abnormal combustion conditions or exceed thermomechanical limits during combustion, to set the cylinder-specific reference cylinder values so as to oppose the abnormal combustion conditions or to guide the cylinder in question to a duty point which is farther away from the thermomechanical limits. Thus, for example, with cylinders with abnormal combustion (for example knocking, auto-ignition, exceeding a peak pressure limit), the injection period or open period of the fuel metering valve might not be extended or, if necessary, might be shortened. In this manner, for example, for a cylinder with intermittent combustion, the injection period might not be shortened or even might be extended.

In general, also, at the same time as controlling as regards a cylinder-specific first cylinder signal by adjusting a first combustion parameter, control as regards a further cylinder-specific cylinder signal could be carried out by adjusting a further combustion parameter. Thus, for example, the proposed method could be carried out using the maximum internal cylinder pressure as the cylinder-specific first cylinder signal and using the fuel quantity as the combustion parameter, whereby simultaneously, cylinder-specific control of the combustion ignition point is carried out as a function of the cylinder-specific center of combustion. In this manner, it can be provided that the respective ignition point is adjusted as a function of the deviation of the cylinder-specific center of combustion from a specifiable central value. The specifiable central value may be an overall central value, i.e. valid for all cylinders of the internal combustion engine.

BRIEF DESCRIPTION OF THE DRAWINGS

Further details and advantages of the present invention will now be provided with the aid of the accompanying description of the drawings, in which.

DETAILED DESCRIPTION OF THE INVENTION

Figure 1:
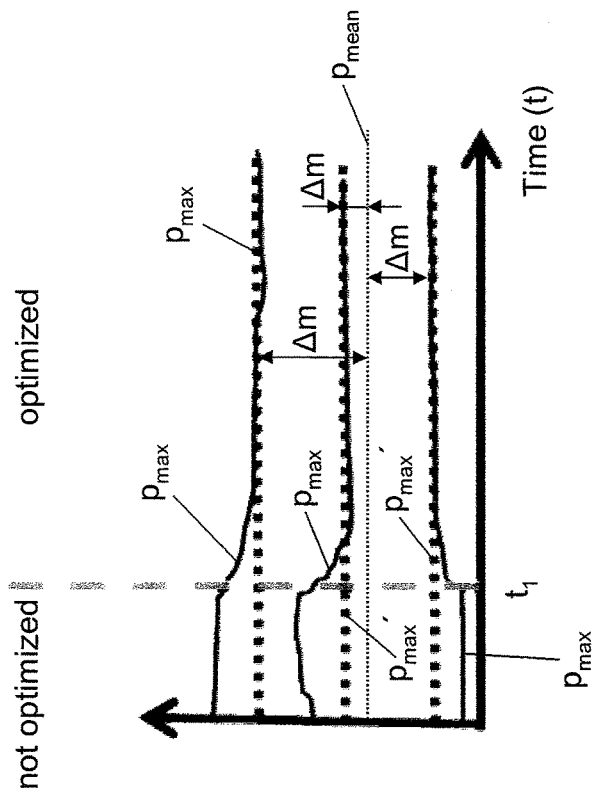
FIG. 1 shows an exemplary representation of the dependency of the cylinder efficiency on NOx emissions from the cylinders of an internal combustion engine.

FIG. 1 shows, by way of example, the cylinder efficiencies $\eta_{cyl}$ of two cylinders 2 of an internal combustion engine 1 (see FIG. 3) as a function of their respective NOx emissions $E_{cyl}$ as well as desired target values to be obtained with the proposed method for the NOx emissions $E_{cyl}'$ and for the cylinder efficiencies $\eta_{cyl}'$ of all cylinders 2.

The profile of a cylinder efficiency $\eta_{cyl}$ to be obtained exhibits therein a non-linear dependency on the respective NOx emission $E_{cyl}$ of the corresponding cylinder 2. The different NOx emissions $E_{cyl}$ shown and the associated respectively different cylinder efficiencies $\eta_{cyl}$ of the cylinders can in particular be caused by cylinder-specific differences in cylinder parameters—such as different air charges, deposits and wear, centers of combustion, or mechanical tolerances of the cylinders 2.

By means of the proposed method, these different cylinder-specific cylinder parameters can be taken into account, since for each cylinder 2, a cylinder-specific reference cylinder value $p_{max}'$ is set for a first cylinder signal $p_{max}$ and a combustion parameter Q for the cylinder 2 (for example the quantity of fuel supplied to a cylinder) is set as a function of the deviation of the first cylinder signal $p_{max}$ from the reference cylinder value $p_{max}'$. The first cylinder signal $p_{max}$ tracks the reference cylinder value $p_{max}'$ (see FIG. 2). In particular, in this manner, the cylinder-specific reference cylinder values $p_{max}'$ of the cylinder 2 are adjusted in a manner such that the cylinder-specific NOx emissions $E_{cyl}'$ to be obtained or the cylinder efficiencies $\eta_{cyl}'$ to be obtained for all cylinders 2 lie within a specifiable range or are essentially identical. All in all, by taking the cylinder-specific differences in the cylinder parameters into consideration, a general efficiency can be achieved over all cylinders 2 which is increased compared with the situation when these are not taken into consideration.

Figure 2:
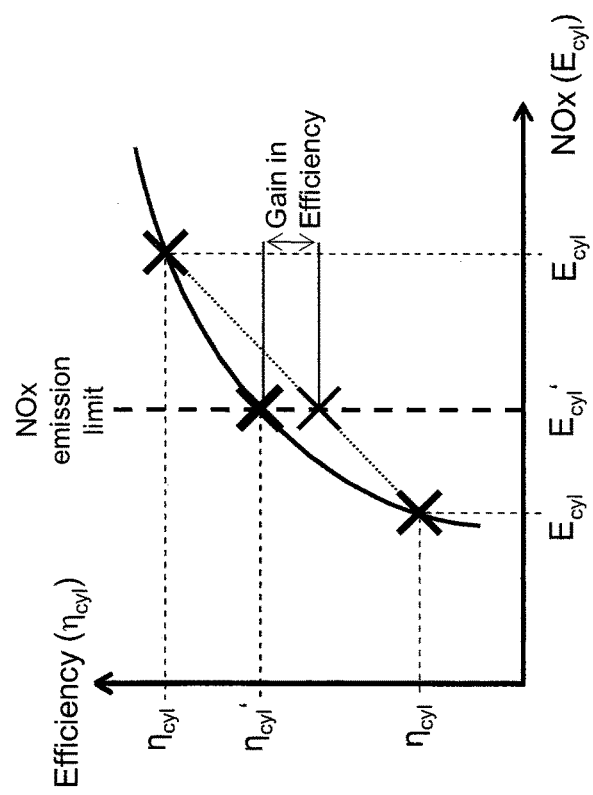
FIG. 2 shows an exemplary representation of the tracking of cylinder-specific first cylinder signals on cylinder-specific reference cylinder values.
Figure 3:
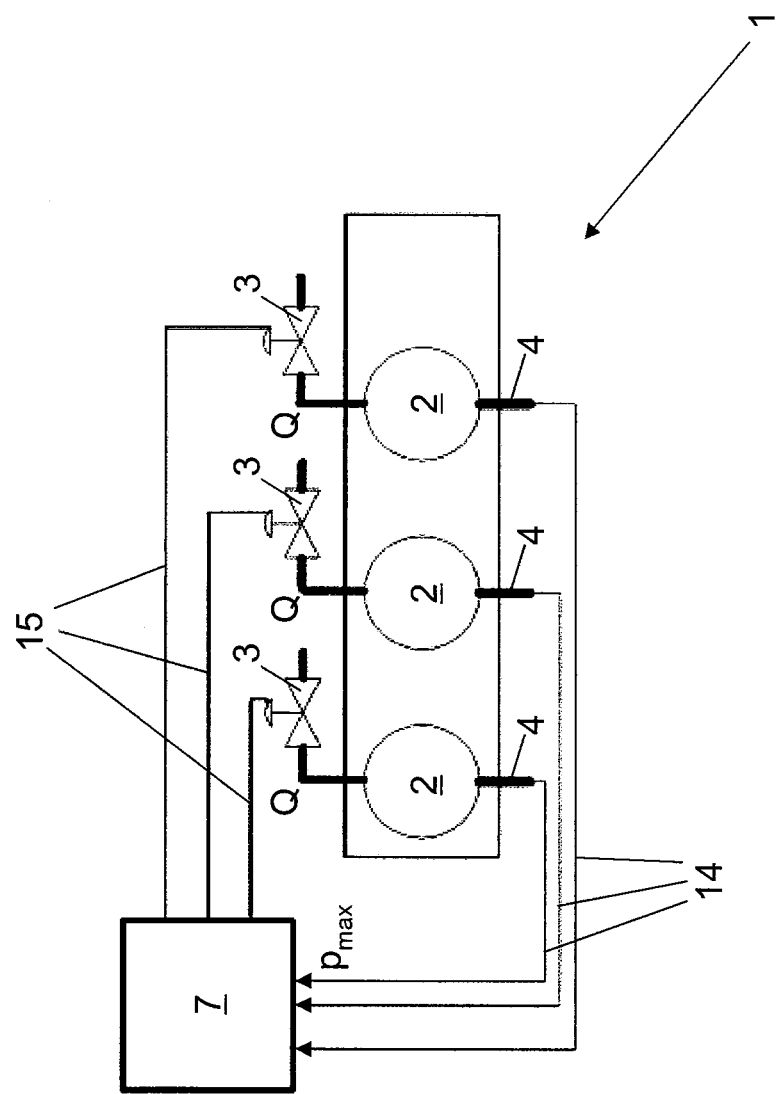
FIG. 3 is a schematic diagram of an internal combustion engine with a plurality of cylinders and a control device for operating the internal combustion engine in accordance with an embodiment of the proposed method.

FIG. 2 shows, for example, the profiles of a respective cylinder-specific first cylinder signal $p_{max}$ over the time t of three cylinders 2 of an internal combustion engine 1 (see FIG. 3). The cylinder-specific first cylinder signals $p_{max}$ here are the respective maximum internal cylinder pressures $p_{max}$ of the corresponding cylinders 2, each acquired over a combustion cycle of the corresponding cylinders 2. Cylinder-specific differences in the cylinder parameters such as air charge or combustion properties result in different profiles for the first cylinder signals $p_{max}$. The proposed method now proposes providing or setting a cylinder-specific reference cylinder value $p_{max}'$ for each cylinder 2, and the respective actual first cylinder signal $p_{max}$ tracks the corresponding reference cylinder value $p_{max}'$. In this manner, for example, despite different cylinder properties or cylinder parameters, the respective NOx emissions $E_{cyl}$ of the cylinders 2 or the cylinder efficiencies $\eta_{cyl}$ for the cylinders 2 exhibit the same or similar values, and all in all can produce an increased overall efficiency over all cylinders 2 than when the differing cylinder parameters of the individual cylinders 2 are not taken into consideration. As shown in the drawing, from a time $t_1$, the individual first cylinder signals $p_{max}$ track the respective cylinder-specific reference cylinder values $p_{max}'$, from which time $t_1$ control in accordance with the proposed method occurs.

The respective reference cylinder values $p_{max}'$ in the example shown are constituted by the arithmetic mean $p_{mean}$ of the maximum internal cylinder pressures $p_{max}$ of all cylinders 2 and a cylinder-specific offset $\Delta m$. The respective offsets $\Delta m$ in this case take account of the cylinder-specific differences in the cylinder parameters (for example air mass equivalent, centre of combustion, compression ratio, ignition delay).

FIG. 3 shows an internal combustion engine 1 with three cylinders 2. A cylinder pressure sensor 4 is associated with each cylinder 2 in order to acquire a cylinder-specific first cylinder signal. The cylinder-specific first cylinder signal may be the profile over time of the internal cylinder pressure or the maximum internal cylinder pressure $p_{max}$ over a combustion cycle. The cylinder-specific first cylinder signal may also be a temporally filtered signal of the maximum internal cylinder pressure $p_{max}$ over a plurality of combustion cycles, for example over 10 to 1000 combustion cycles, preferably over 40 to 100 combustion cycles. The cylinder-specific first cylinder signal $p_{max}$ acquired from a cylinder 2 is transmitted via a signal line 14 to a control device 7. The control device 7 can also carry out the determination of the maximum internal cylinder pressure $p_{max}$ over a combustion cycle or temporal filtering of the maximum internal cylinder pressure $p_{max}$ over a plurality of combustion cycles.

As will be described below, the control device 7 according to the proposed method, determines a respective cylinder-specific fuel quantity Q to be metered as a combustion parameter for the cylinder 2 which is transmitted to the corresponding fuel metering valve 3 via control lines 15. The fuel metering valves 3 dose the corresponding cylinder-specific fuel quantities Q into the cylinders 2 and thus the cylinder-specific first cylinder signals $p_{max}$ track the cylinder-specific reference cylinder values $p_{max}'$ generated by the control device 7 according to the proposed method.

Figure 4:
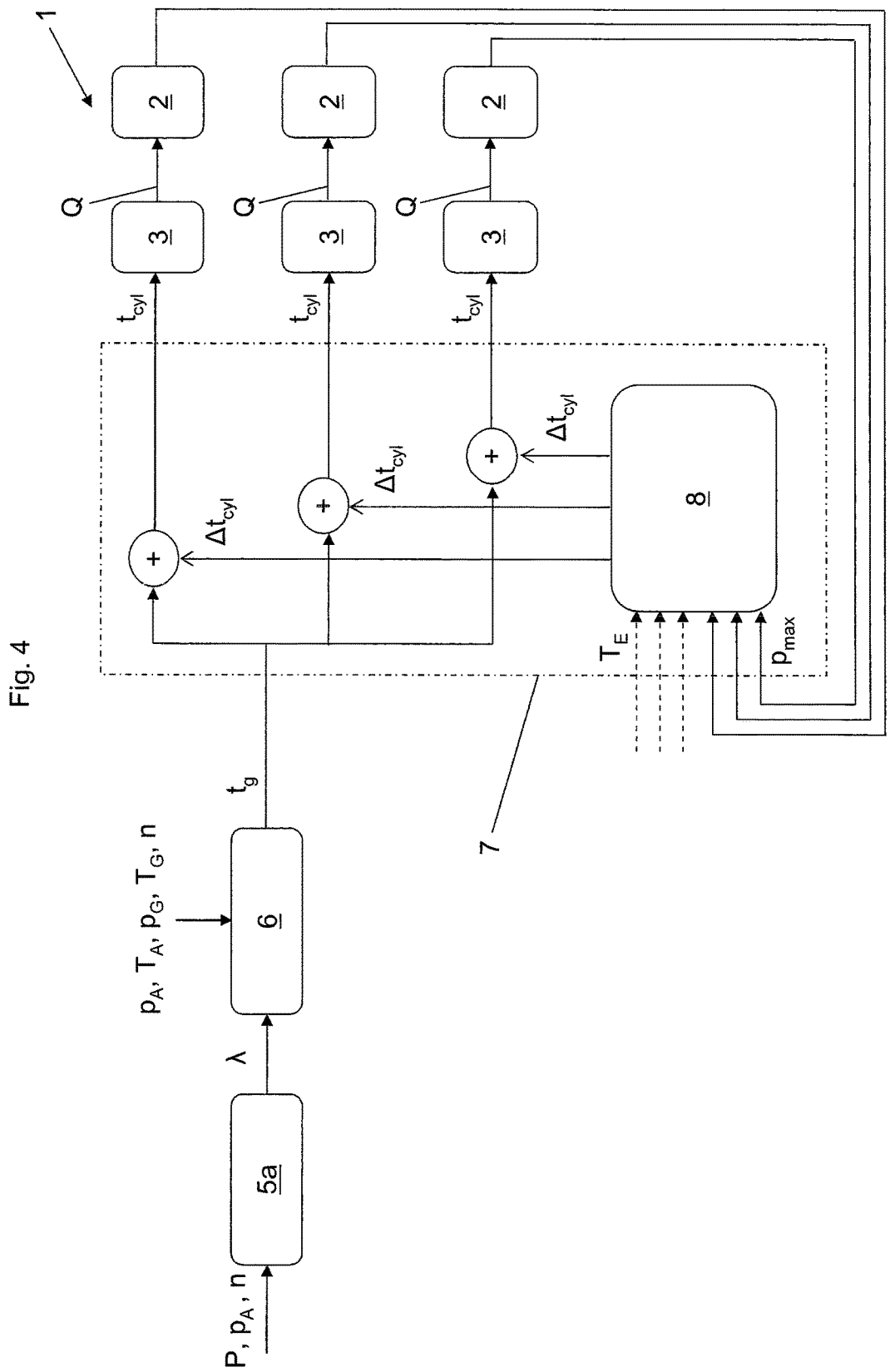
FIG. 4 is a schematic diagram of 3 cylinders of an internal combustion engine and a control device for operating the internal combustion engine in accordance with an embodiment of the proposed method.

FIG. 4 shows a diagrammatic block diagram of three cylinders 2 of an internal combustion engine 1 with an air-led combustion process. A fuel metering valve 3 is associated with each cylinder 2, wherein the fuel quantity Q supplied to the corresponding cylinder 2 can be adjusted by the respective fuel metering valve 3. A control device 7 controls the fuel metering valves 3, whereby the control device 7 outputs a respective cylinder-specific open period for the fuel metering valve 3 in the form of a cylinder-specific parameter $t_{cyl}$.

The fuel metering valves 3 in this example are port injection valves which have only a completely open and a completely closed position. When the fuel metering valve 3 is in the completely open position, a fuel in the form of a propellant gas is injected into the inlet tract of the cylinder 2 associated with the fuel metering valve 3. The open period of the fuel metering valve 3 can thus be used to set the fuel quantity Q for the respective cylinder 2.

A cylinder-specific first cylinder signal $p_{max}$ is acquired from each cylinder 2 and supplied to the control device 7. In this regard, a "cylinder-specific first cylinder signal $p_{max}$" corresponds to the maximum internal cylinder pressure of the corresponding cylinder 2 during a combustion cycle. In the example shown, the cylinder-specific first cylinder signals $p_{max}$ are supplied to a differential value processor 8 of the control device 7. The differential value processor 8 determines a difference value $\Delta t_{cyl}$ for each cylinder 2, or for each fuel metering valve 3, which is respectively added to a specifiable target value $t_g$. Thus, a cylinder-specific open period is generated for each fuel metering valve 3 as a parameter $t_{cyl}$.

The specifiable overall engine target value $t_g$ in the example shown is determined from a specifiable fuel-air ratio $\lambda$, wherein the specifiable fuel-air ratio X is determined by an emission controller 5a from a power equivalent P of the output power of the internal combustion engine 1 (for example the electrical power measured for a generator connected to the internal combustion engine 1) and/or from a charge air pressure $p_A$ and/or from an engine speed n of the internal combustion engine 1. In addition to the fuel-air ratio $\lambda$, in a target value processor 6, the pressure $p_A$ and the temperature $T_A$ of the charge air, the pressure $p_G$ and the temperature $T_G$ of the fuel supply as well as the engine speed n of the internal combustion engine 1 may also be input. Furthermore, yet another flow parameter of the fuel metering valve 3 (for example the effective diameter of flow in accordance with the polytropic outflow equation or a Kv value) as well as fuel or combustion gas characteristics (for example the gas density, the polytropic exponent or the calorific value) can be input into the target value processor 6. The target value processor 6 then determines the specifiable target value $t_g$, which corresponds to an overall engine basic open period value for the open periods of all of the fuel metering valves 3.

By means of the difference value processor 8, a cylinder-specific open period offset or difference value $\Delta t_{cyl}$ is determined for each individual fuel metering valve 3. These cylinder-specific difference values $\Delta t_{cyl}$ are dependent on the deviation of the peak cylinder pressure $p_{max}$ of the respective cylinder 2 from the respective cylinder-specific reference cylinder value $p_{max}'$. The respective sum of the overall engine basic open period value $t_g$ and the cylinder-specific open period offset $\Delta t_{cyl}$ generates the target open period $t_{ry}$, for the respective fuel metering valve 3 controlled by the drive electronics.

Alternatively or in addition to using the maximum internal cylinder pressure $p_{max}$ as the cylinder-specific first cylinder signal, the use of the respective cylinder-specific cylinder exhaust temperature $T_E$ is indicated in dashed lines.

In this manner, again, deviations in the cylinder-specific cylinder exhaust temperatures $T_E$ from the respective cylinder-specific reference cylinder values for the cylinder exhaust temperatures can be used to calculate the corresponding cylinder-specific open period offsets $\Delta t_{cyl}$. The cylinder-specific cylinder exhaust temperatures $T_E$ may be used as an alternative, for example, when no internal cylinder pressure sensors 4 have been installed or also as a fall-back position if the cylinder pressure signals fail, in order to increase the availability of the internal combustion engine 1 in the case of a cylinder pressure sensor failure.

Figure 5:
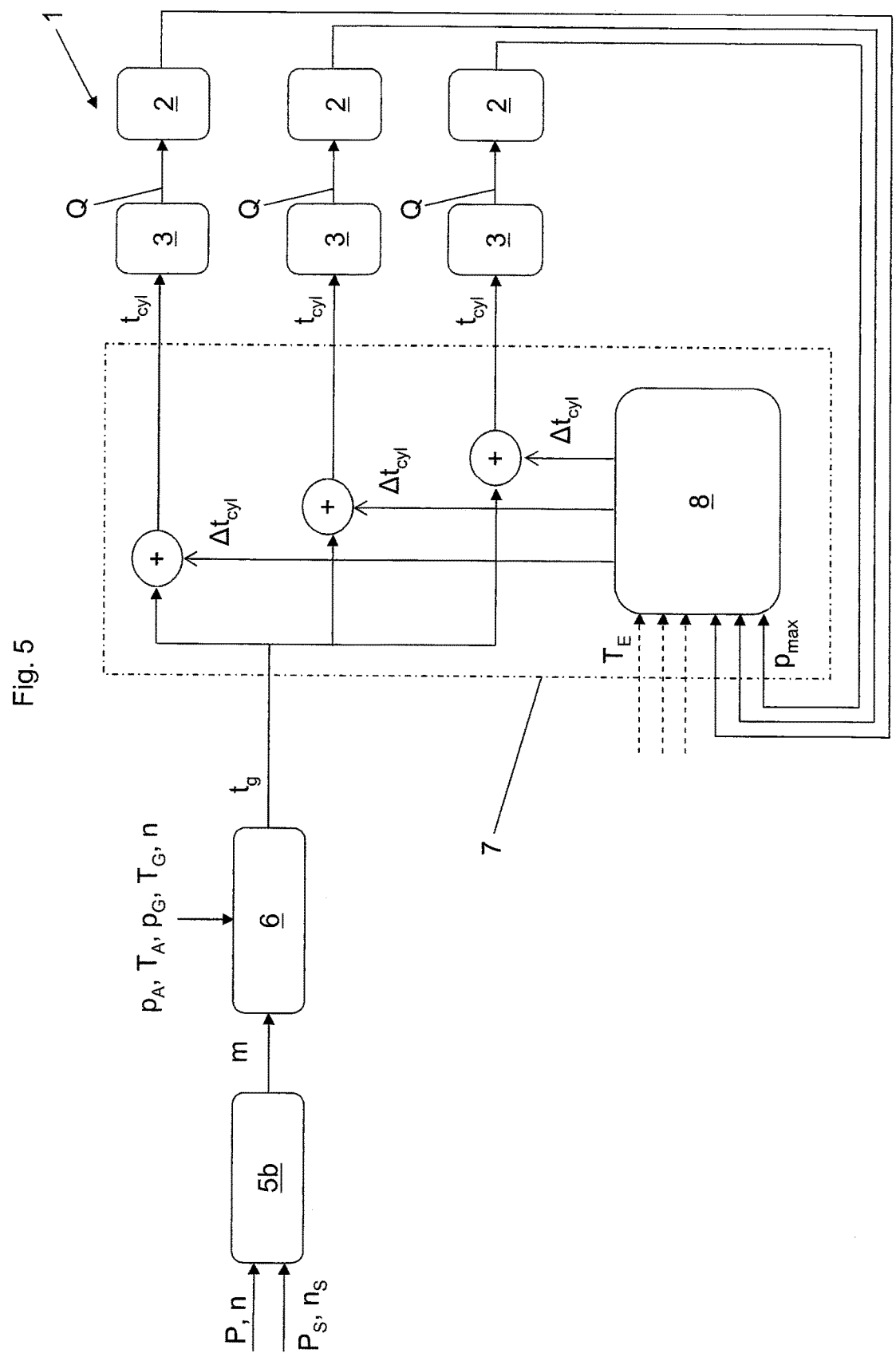
FIG. 5 is a schematic diagram similar to FIG. 4 showing an internal combustion engine with a fuel-led combustion process.

FIG. 5 shows a block diagram similar to FIG. 4. In this case, the internal combustion engine 1 is powered by a gas-led combustion process. The specifiable overall engine target value $t_g$ in the example shown is determined by a controller 5b which can comprise a power controller and/or a speed controller. For the power controller, in addition to a power equivalent P for the output power of the internal combustion engine 1 (actual power), a specifiable target power equivalent $P_s$ (reference power) of the internal combustion engine 1 can serve as the input variable. For the speed controller, in addition to a respective actual engine speed n (actual speed) of the internal combustion engine 1, a specifiable target speed $n_s$ (reference speed) of the internal combustion engine 1 can serve as the input variable. In the controller 5b, an overall engine default value for the fuel mass flow m is determined, from which subsequently, in a target value processor 6 the specifiable overall engine target value $t_g$—for example for the overall engine open period of fuel metering valves or for the overall engine default value for the ignition point of ignition devices—is determined.

Figure 6:
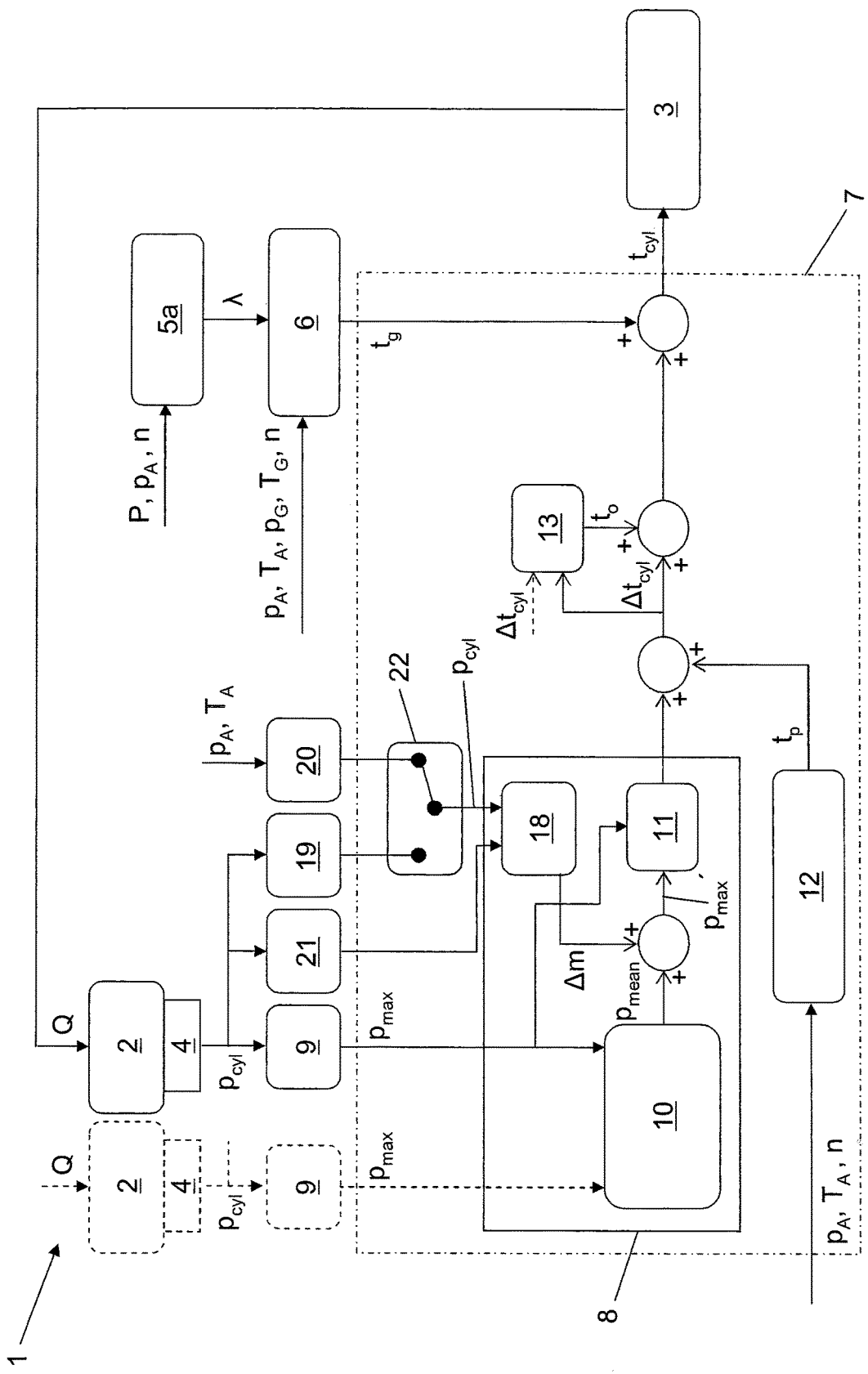
FIG. 6 is a schematic diagram of a proposed control device.

FIG. 6 shows a block diagram similar to FIG. 4, in which the control device 7 as well as the difference value processor 8 are shown in more detail. This representation shows details of the control procedure for just one cylinder 2 of the internal combustion engine 1. Other cylinders 2 of the internal combustion engine 1 are shown here as dashed lines.

An internal cylinder pressure sensor 4 is associated with each cylinder 2. An internal cylinder pressure sensor 4 can thus acquire the profile of the internal cylinder pressure $p_{cyl}$ over a combustion cycle. A maximum acquired value processor 9 can determine the maximum internal cylinder pressure $p_{max}$ or the peak pressure of the respective cylinder 2 in the preceding combustion cycle.

The peak pressures of all cylinders 2 are supplied to a mean computation processor 10 as cylinder-specific first cylinder signals $p_{max}$. In the example shown, this mean computation processor 10 generates the arithmetic mean $p_{mean}$ from the cylinder-specific first cylinder signals $p_{max}$ and outputs it. In addition, a cylinder-specific offset Δm is computed in an offset processor 18 and output. The sum of the arithmetic mean $p_{mean}$ of the cylinder-specific first cylinder signals $p_{max}$ from all cylinders 2 and the cylinder-specific offset Δm in the example shown generates the cylinder-specific reference cylinder value $p_{max}'$ which is supplied to the reference value controller 11.

In the example shown, the cylinder-specific offset Δm is computed in an offset computation processor 18 from the internal cylinder pressure in the corresponding cylinder 2 before ignition $p_{cyl}'$ (after closing an inlet valve associated with the cylinder 2 during the compression stroke) and from the center of combustion of the cylinder 2. In this manner, the internal cylinder pressure before ignition $p_{cyl}'$ is either determined directly from the temporal profile of the internal cylinder pressure signal $p_{cyl}$ via a corresponding pressure computation processor 19 or from a load-dependent pressure determination characteristic mapping 20. The pressure determination characteristic mapping 20 here can contain appropriate values for the internal cylinder pressure before ignition $p_{cyl}'$, which are dependent on the load and/or the charge air pressure $p_A$ and/or the charge air temperature $T_A$ and/or the engine speed n of the internal combustion engine 1. The selection of the source for the value of the internal cylinder pressure before ignition $p_{cyl}'$ is made by a pressure source switch 22. The determination of the center of combustion of the respective cylinder 2 is carried out in a center of combustion computation processor 21 in known manner from the temporal profile of the internal cylinder pressure signal $p_{cyl}$.

In general, the cylinder-specific offset Δm can be determined as a function of at least one of the following cylinder-specific cylinder parameters: air mass equivalent, center of combustion, compression ratio, ignition delay. Thus, the determination of the cylinder-specific offset Δm can be based on deviations of at least one of the respective cylinder parameters from the mean of this cylinder parameter over all cylinders 2.

In the reference value controller 11, the deviation of the first cylinder signal $p_{max}$ of a cylinder 2 from the corresponding reference cylinder value $p_{max}'$ is determined. Subsequently, a difference value $\Delta t_{cyl}$ is determined for the fuel metering valve 3 associated with the cylinder 2.

The respective difference value $\Delta t_{cyl}$ for a fuel metering valve 3 associated with the respective cylinder 2 is then added to an overall engine specifiable target value $t_g$, whereupon an open period for the fuel metering valve 3 is generated as a parameter $t_{cyl}$. The specifiable target value $t_g$ is thus determined, as described in FIG. 4, from an emission controller of the internal combustion engine 1. It can basically also be determined from a power controller and/or from a speed controller (as described in FIG. 5) of the internal combustion engine 1.

In the example shown, the respective difference value $\Delta t_{cyl}$ comprises a cylinder-specific pilot value $t_g$, which is determined by a pilot value computation 12 from the charge air pressure $p_A$ and/or the charge air temperature $T_A$ and/or the engine speed n of the internal combustion engine 1. This respective pilot value $t_g$ can, for example, be determined by measurements during placing the internal combustion engine into operation and set out in a characteristic mapping.

In general, the reference value controller 11 can, for example, be a P-, PI- or PID controller. However, other controller concepts and controller types may be used, for example a LQ controller, a robust controller or a fuzzy controller.

In order to avoid unwanted consequences for the overall engine control, and in particular the emission controller 5a, the respective difference values $\Delta t_{cyl}$ are in addition provided with an equalization value $t_o$ from an equalization value processor 13. This equalization value $t_o$, which is the same for all difference values $\Delta t_{cyl}$, corresponds to the arithmetic mean of the difference values $\Delta t_{cyl}$ of all cylinders 2 and can be positive or negative. Thus, it is possible to apply the proposed method to internal combustion engines 1 which until now have been operated without cylinder balancing or only with a general controller, without this additional control having an impact on the overall engine control.

Figure 7:
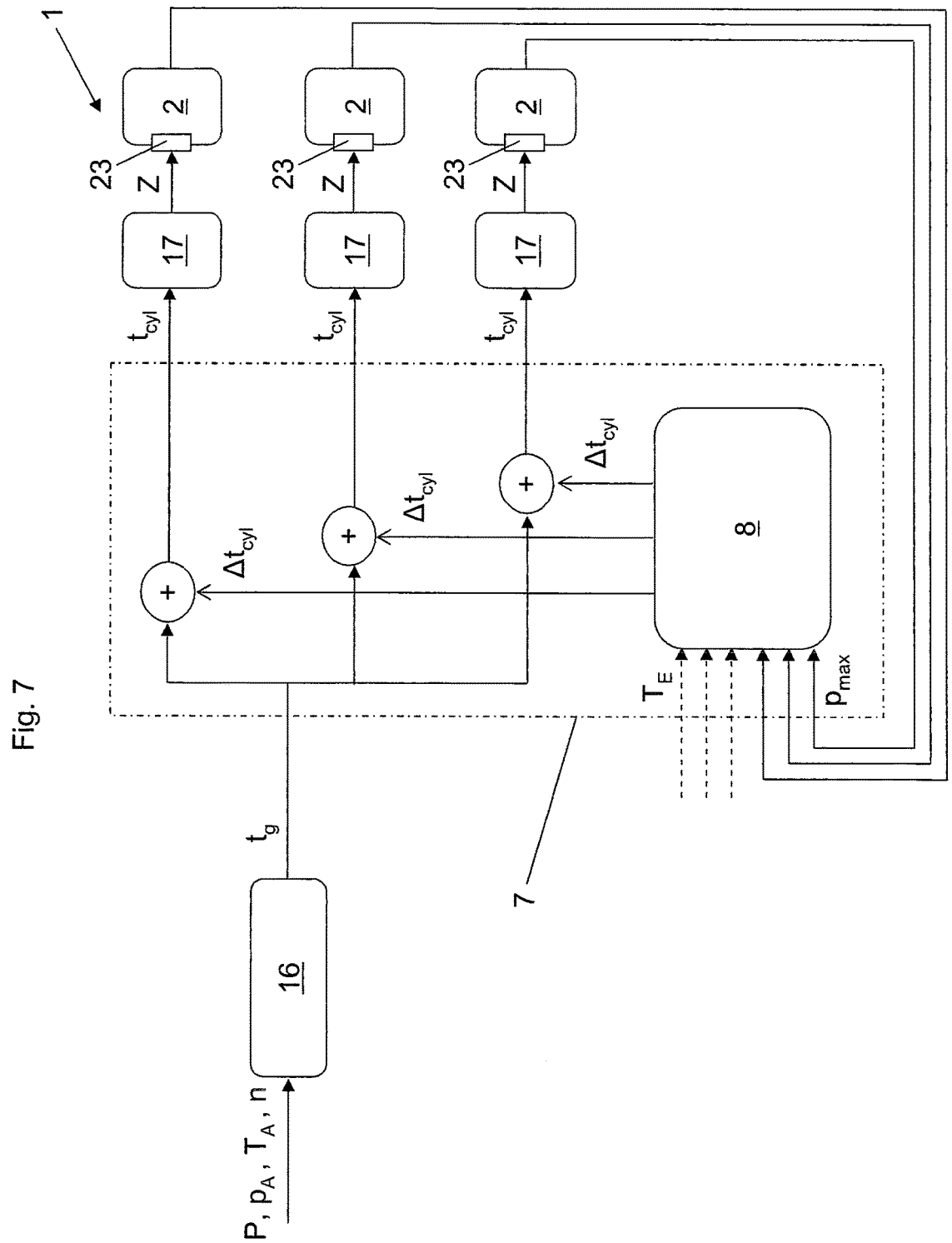
FIG. 7 is a schematic diagram similar to FIG. 4 showing a further embodiment of the proposed method.

FIG. 7 shows a diagrammatic block schematic similar to FIG. 4. However, in the illustrated embodiment of the invention, the ignition points Z from ignition devices 23 on or in the cylinders 2 rather than the fuel quantities Q for the cylinders 2 are set. The overall specifiable target value $t_g$ (overall default value) for the ignition point Z in this case is determined from an ignition point characteristic mapping 16, in which ignition point characteristic mapping 16 suitable values are presented for the overall default value $t_g$ as a function of the power or the power equivalent P and/or the charge air pressure $p_A$ and/or the charge air temperature $T_A$ and/or the engine speed n of the internal combustion engine 1. The respective parameter $t_{cyl}$ determined by the control device 7—expressed in degrees of crank angle before TDC—is sent to an ignition controller 17. The ignition controller 17 activates the respective ignition device 23 at the given ignition point Z. In this manner, in this example, the ignition point Z of a cylinder 2 is set earlier with respect to the overall default value $t_g$ if the peak cylinder pressure $p_{max}$ of the cylinder 2 (first cylinder signal) is smaller than the reference cylinder value $p_{max}'$ and the ignition point Z of a cylinder 2 is set later with respect to the overall default value $t_g$ if the peak cylinder pressure $p_{max}$ of the cylinder 2 is larger than the reference cylinder value $p_{max}'$.

Figure 8:
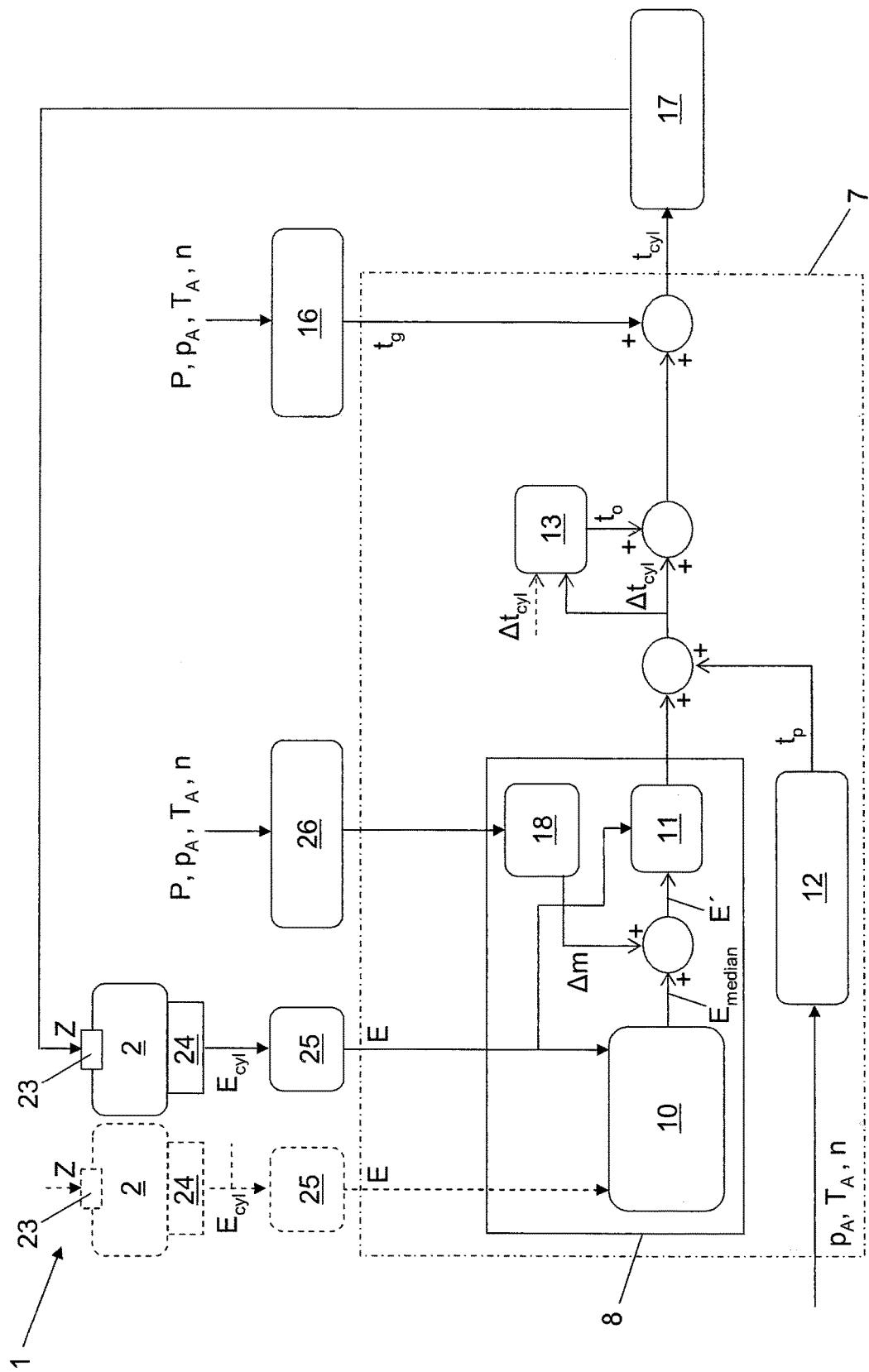
FIG. 8 is a schematic diagram of a control device of a further embodiment of the proposed method.

FIG. 8 shows a diagrammatic block schematic of a further embodiment of the invention which is similar to that of FIG. 6, but the ignition points Z of the ignition devices 23 on or in the cylinders 2 rather than the fuel quantities Q for the cylinder 2 are set. In this example, the nitrogen oxide emissions $E_{cyl}$ of a cylinder 2 are respectively acquired over a combustion cycle from a NOx probe 24 and sent to an analytical unit 25. From the temporal profile of the nitrogen oxide emissions $E_{cyl}$ over a combustion cycle, the analytical unit 25 determines a filtered emission value which is sent as the cylinder-specific signal E to the reference value processor 10. The reference value processor 10 generates the median $E_{median}$ from the cylinder-specific signals E from all cylinders 2 and outputs it. In addition, in an offset processor 18, a cylinder-specific offset $\Delta m$ is computed and output. The sum of the median $E_{median}$ and the cylinder-specific offset $\Delta m$ in the example shown generates the cylinder-specific reference cylinder value E', which is sent to a reference value controller 11.

The cylinder-specific offset $\Delta m$ in the example shown is determined in an offset processor 18 by reading out a difference value characteristic mapping 26, in which appropriate values for the offset $\Delta m$ for the corresponding cylinder 2 are recorded as a function of the power P and/or the charge air pressure $p_A$ and/or the charge air temperature $T_A$ and/or the engine speed n of the internal combustion engine 1. Here, the values deposited in the difference value characteristic mapping 26 for the cylinder-specific offsets $\Delta m$ of the cylinders 2 were determined on a test rig.

In the reference value controller 11, the deviation of the cylinder-specific signal E from the reference cylinder value E' is determined and as a function thereof, a difference value $\Delta t_{cyl}$ is determined for the ignition point Z of an ignition device 23 associated with the corresponding cylinder 2. The respective difference value $\Delta t_{cyl}$ is then added to the overall engine specifiable target value $t_g$, whereupon an ignition point Z is generated in degrees of crank angle before TDC as the parameter $t_{cyl}$ and sent to an ignition controller 17. The ignition controller 17 activates the ignition device 23 (for example a spark plug) at the given ignition point Z. The specifiable target value $t_g$ in this regard is determined from an ignition point characteristic mapping 16 as described in FIG. 7.

The invention claimed is:

1. A method of operating an internal combustion engine having at least two cylinders, said method comprising:
    acquiring a cylinder-specific first cylinder signal from each of the at least two cylinders via a sensor; and
    controlling a combustion parameter of each of the at least two cylinders as a function of the respective cylinder-specific first cylinder signal using a control device;
    wherein said controlling comprises setting a cylinder-specific reference cylinder value for the cylinder-specific first cylinder signal for each of the at least two cylinders via the control device such that at least one of NOx emissions and combustion efficiency of the at least two cylinders is identical or similar, and using the control device to adjust the combustion parameter of each of the at least two cylinders as a function of a deviation of the respective cylinder-specific first cylinder signal from a corresponding cylinder-specific reference cylinder value such that the respective cylinder-specific first cylinder signal tracks the corresponding cylinder-specific reference cylinder value.

2. The method according to claim 1, wherein the cylinder-specific first cylinder signal is at least one of: an internal cylinder pressure signal, a cylinder exhaust temperature signal, a nitrogen oxide emissions signal, and a combustion air ratio signal.

3. The method according to claim 2, wherein the cylinder-specific first cylinder signal is a maximum internal cylinder pressure of a combustion cycle signal.

4. The method according to claim 1, wherein the cylinder-specific reference cylinder value comprises a statistical variable of first cylinder signals of all of the at least two cylinders, and comprises a cylinder-specific offset from the statistical variable of the first cylinder signals.

5. The method according to claim 4, wherein the statistical variable of the first cylinder signals of all of said at least two cylinders is the arithmetic mean value.

6. The method according to claim 4, wherein the statistical variable of the first cylinder signals of all of said at least two cylinders is the median value.

7. The method according to claim 4, wherein the cylinder-specific offset is determined by a difference value characteristic mapping, the difference value characteristic mapping accounting for at least one of a power equivalent of an output power of the internal combustion engine and a charge air pressure of the internal combustion engine.

8. The method according to claim 7, wherein the difference value characteristic mapping further accounts for at least one of a charge air temperature and an engine speed of the internal combustion engine.

9. The method according to claim 4, wherein the cylinder-specific offset is determined as a function of at least one of: a cylinder pressure during a compression phase before ignition, an air mass equivalent, a center of combustion, a compression ratio, and an ignition delay.

10. The method according to claim 9, wherein the cylinder-specific offset is determined as a function of at least one deviation of a cylinder parameter from a mean value of the cylinder parameter of all of the at least two cylinders.

11. The method according to claim 10, wherein the cylinder-specific offset is determined from respective deviations of cylinder parameters using the following formula:

$$\Delta m = a^* \Delta pverd + b^* \Delta air + c^* MFB + d^* \Delta e + e^* / \Delta delay$$

wherein $\Delta pverd$ is a deviation of the cylinder pressure during the compression phase before ignition, flair is a deviation of the air mass equivalent, $\Delta MFB$ is a deviation in the center of combustion, $\Delta \epsilon$ is a deviation in the compression ratio and $\Delta delay$ is a deviation in the ignition delay, and a, b, c, d, e are weighting coefficients for the deviations.

12. The method according to claim 1, wherein the combustion parameter is a fuel quantity for each of the at least two cylinders.

13. The method according to claim 12, wherein said adjusting of the combustion parameter comprises increasing the fuel quantity for the corresponding cylinder if the respective cylinder-specific first cylinder signal is smaller than the corresponding cylinder-specific reference cylinder value.

14. The method according to claim 12, wherein said adjusting of the combustion parameter comprises decreasing the fuel quantity for the corresponding cylinder if the respective cylinder-specific first cylinder signal is larger than the corresponding cylinder-specific reference cylinder value.

15. The method according to claim 12, wherein a fuel metering valve is provided for each of the at least two cylinders, wherein said adjusting of the combustion parameter comprises adjusting an open period for each corresponding fuel metering valve to adjust the fuel quantity for each respective one of the at least two cylinders.

16. The method according to claim 1, wherein the combustion parameter is an ignition point for each of the at least two cylinders.

17. The method according to claim 16, wherein said adjusting of the combustion parameter comprises setting the ignition point earlier for a corresponding one of the at least two cylinders if the respective cylinder-specific first cylinder signal is smaller than the corresponding cylinder-specific reference cylinder value.

18. The method according to claim 16, wherein said adjusting of the combustion parameter comprises setting the ignition point later for a corresponding one of the at least two cylinders if the respective cylinder-specific first cylinder signal is larger than the corresponding cylinder-specific reference cylinder value.

19. The method according to claim 16, wherein an ignition device is provided for each of the at least two cylinders, wherein the ignition point for the ignition device is set in degrees of crank angle before TDC.

20. The method according to claim 1, wherein said adjusting the combustion parameter comprises determining a specifiable overall engine target value.

21. The method according to claim 20, wherein said determining of the specifiable overall engine target value comprises determining the specifiable overall engine target value from a specifiable fuel-air ratio.

22. The method according to claim 21, wherein the specifiable fuel-air ratio is determined from at least one of a power equivalent of an output power of the internal combustion engine, a charge air pressure, and an engine speed of the internal combustion engine.

23. The method according to claim 21, wherein the specifiable fuel-air ratio is determined from at least one of an electrical power from a generator connected to the internal combustion engine, a charge air pressure, and an engine speed of the internal combustion engine.

24. The method according to claim 20, wherein the specifiable overall engine target value is determined as a function of at least one of: (i) a deviation of a power equivalent of an output power of the internal combustion engine from a specifiable target power equivalent, and (ii) a deviation of an engine speed of the internal combustion engine from a specifiable target speed of the internal combustion engine.

25. The method according to claim 1, wherein said controlling further comprises using the control device to monitor a combustion condition of each of the at least two cylinders, and determine whether the combustion condition is normal or abnormal with respect to a specifiable reference state, and said adjusting comprises only adjusting the combustion parameter of the corresponding one of the at least two cylinders if the combustion condition is determined to be normal.

26. The method according to claim 25, wherein the combustion condition is at least one of knocking, auto-ignition, and interruptions in combustion, and the combustion condition of each of the at least two cylinders is determined to be normal if no knocking, auto-ignition, or interruptions in the combustion are identified.

27. An internal combustion engine comprising:
at least two cylinders;
a sensor for acquiring a cylinder-specific first cylinder signal from each of said at least two cylinders; and
a control device for controlling a combustion parameter of each of said at least two cylinders as a function of the respective cylinder-specific first cylinder signal;
wherein said control device is configured to set a cylinder-specific reference cylinder value for the cylinder-specific first cylinder signal for each of said at least two cylinders such that at least one of NOx emissions and combustion efficiency of the at least two cylinders is identical or similar, and to adjust the combustion parameter of each of said at least two cylinders as a function of a deviation of the respective cylinder-specific first cylinder signal from a corresponding cylinder-specific reference cylinder value such that the respective cylinder-specific first cylinder signal tracks the corresponding cylinder-specific reference cylinder value.

* * * * *